United States Patent

Kitamura et al.

[11] Patent Number: 4,697,796
[45] Date of Patent: Oct. 6, 1987

[54] SUSPENSION DEVICE

[75] Inventors: Makoto Kitamura; Kiyoshi Yamaguchi, both of Kanagawa, Japan

[73] Assignee: Tokico Ltd., Kanagawa, Japan

[21] Appl. No.: 788,428

[22] Filed: Oct. 17, 1985

[30] Foreign Application Priority Data

Oct. 20, 1984 [JP] Japan .............................. 59-158884[U]
Mar. 20, 1985 [JP] Japan .............................. 60-41001[U]

[51] Int. Cl.$^4$ ................................................ F16F 9/44
[52] U.S. Cl. .................................. 267/35; 267/64.24; 267/195
[58] Field of Search ................. 188/285; 267/8 R, 35, 267/64.15, 64.22, 64.23; 280/668, 712

[56] References Cited

U.S. PATENT DOCUMENTS 3,039,760 6/1962 Jackson .
3,363,893 1/1968 Goddard .
3,967,363 7/1976 Meyer .
4,534,580 8/1985 Kobayashi et al. .......... 267/64.25 X
4,592,540 6/1986 Yokoya et al. .............. 267/64.22 X
4,616,811 10/1986 Buma ............................ 267/8 R X

FOREIGN PATENT DOCUMENTS 58-161710 10/1983 Japan .
59-53107 4/1984 Japan .

Primary Examiner—Duane A. Reger
Attorney, Agent, or Firm—Wenderoth, Lind & Ponack

[57] ABSTRACT

A suspension device for use in a vehicle such as an automobile includes a hydraulic damper combined with an air spring unit. The air spring unit includes two air chambers, and the communication therebetween is controlled by a rotary flow control valve.

10 Claims, 15 Drawing Figures

SUSPENSION DEVICE

BACKGROUND OF THE INVENTION

This invention relates to a suspension device of a vehicle such as an automobile and, particularly, to a suspension device of the kind comprising a hydraulic damper and an air spring associated therewith.

A suspension device of the aforesaid kind is publicly known, as shown in U.S. Pat. Nos. 3,039,760, 3,363,893, and 3,967,363, wherein a variable volume air chamber constituting the air spring is formed between the upper end portion of a tubular main body of the hydraulic damper and the upper end of a piston rod of the hydraulic damper which projects upward from the main body. By adjusting the pressure in the air chamber, it is possible to adjust the level of the vehicle in response to such as the loading of the vehicle. The spring rate of the air spring is determined by the volume of the air chamber and the pressure of the air, and thus, there is a problem that it is not possible to adjust the spring rate of the air spring as desired. Japanese Utility Model Disclosures Nos. (Kokai) 58-161710 and 59-53107 show a suspension device wherein the air chamber in the air spring is partitioned into a variable volume main air chamber and a constant volume sub chamber, and a valve is provided between the two chambers for selectively permitting or interrupting communication therebetween. In adjusting the level of the vehicle the two chamber are communicated together and the pressure in the air chambers is adjusted, and thereafter by closing the valve to separate the two chambers the suspension takes a hard condition. However, it is further desired to adjust the spring rate of the air spring at multiple steps, and to generate a damping force by the air spring unit.

SUMMARY OF THE INVENTION

The present invention has been made in view of the above circumstances and provides a suspension device comprising a hydraulic damper, a plurality of air chambers associated with the hydraulic damper, at least one rotary flow control valve provided between adjacent two air chambers and defining one or more orifice passages, and means for rotating a valve body of the flow control valve to change the effective passage area of a passage communicating the two air chambers.

According to a preferred embodiment of the invention, the flow control valve comprises a stationary tubular valve seat and a coaxial rotatable tubular valve body fitted in the valve seat with a plurality of circumferentially spaced openings acting as orifice passages being formed in either of peripheral walls of the valve body and the valve seat.

According to the invention it is possible to generate a damping force by the air spring of about 20% of that of the hydraulic damper.

BRIEF DESCRIPTION OF THE DRAWINGS

Further objects and advantages of the invention will become apparent from the following detailed description of preferred embodiments thereof with reference to the in accompanying drawings, in which.

DETAILED DESCRIPTION OF THE INVENTION

Figure 1:
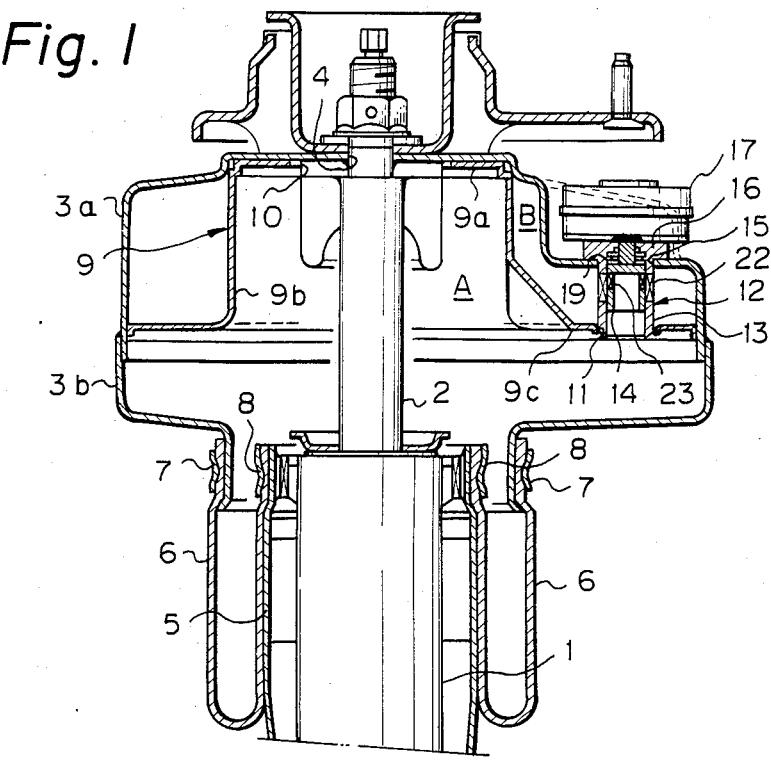
FIG. 1 is a partial longitudinal sectional view of a suspension device according to the invention.

FIG. 1 shows a hydraulic damper consisting of a tubular main body 1 (the lower portion of which is not shown in the drawing) and a rod 2 slidably extending through the upper end of the main body 1, and an air spring unit connected to the hydraulic damper. The air spring unit comprises an upper outer shell 3a, a lower outer shell 3b, a generally U shaped rubber tube 6, and a partition wall 9. A central opening 4 is formed in the upper outer shell 3a for passing therethrough the upper end portion of the rod 2 and being secured thereto. It will be understood that the rod 2 is connected to a body of a vehicle such as an automobile and the lower end of the main body 1 of the hydraulic damper is connected to such as a wheel axle of the vehicle.

The upper outer shell 3a has a downwardly extending circumferential wall to which the upper end of a circumferential wall of the lower outer shell 3b is secured by such as welding, and the upper end of the outer wall of the rubber tube 6 is tightly connected to a reduced diameter lower end portion of the lower outer shell 3b by a tightening ring 7. The upper end of the inner wall of the rubber tube 6 is tightly connected to a protecting tube 5 by a tightening ring 8. The protecting tube 5 surrounds at least the upper portion of the main body 1 of the hydraulic damper and is sealingly secured thereto. Thus, the upper and lower outer shells 3a and 3b and the rubber tube 6 define a sealed space surrounding the upper portion of the hydraulic damper. The partition wall 9 has a top wall 9a, a cylindrical wall 9b and a flange portion 9c. The top wall 9a is fixedly attached to the inner surface of the upper wall of the upper outer shell 3a and has a central opening 10 for passing freely therethrough the rod 2. The outer periphery of the flange portion 9c is fixed to the inner circumference of the lower end portion of the upper outer shell 3a. Thus, the partition wall 9 acts to partition the interior of the aforesaid sealed space into two air chambers A and B, wherein the air chamber A is of variable volume and is defined by the lower surface of the partition wall 9, the inner surface of the lower outer shell 3b and the inner surface of the rubber tube 6. The air chamber B has a constant volume and is defined between the upper outer shell 3a and the partition wall 9. Although not shown in the drawing, there is provided a fitting for connecting chamber A or B selectively with a source of air pressure or with the atmosphere to adjust the level of the vehicle.

Figure 2:
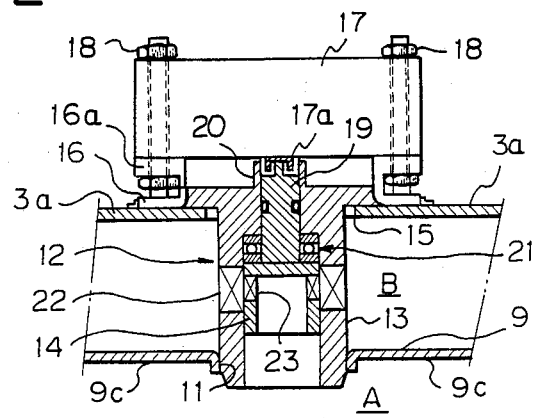
FIG. 2 is an enlarged sectional view showing a rotary valve in FIG. 1.

As shown in FIGS. 1 and 2, an opening 11 is formed in the flange portion 9c of the partition wall 9, and an outer tube 13 of a flow control valve 12 is sealingly connected to the opening 11. The upper end portion of the outer tube 13 passes through an opening 15 in the upper outer shell 3a and has a flange 16 for sealingly engaging with the outer surface of the upper outer shell 3a around the opening 15. An electric motor 17 is mounted on a mounting portion 16a of the flange 16 by such as bolts 18.

An inner tube 14 having a closed upper end and an open lower end is rotatably received in the outer tube 13. A shaft 19 is secured to the closed upper end of the inner tube 14, and is rotatably supported by a small diameter bore portion of the outer tube 13. The shaft 19 is drivingly connected to an output shaft 17a of the motor 17. Shown at 20 in FIG. 2 is an annular projection formed on the upper central portion of the flange 16 for rotatably supporting the output shaft 17a of the motor 17. Shown at 21 in FIG. 2 is a thrust ball bearing for journalling the inner tube 14 and the shaft 19 with respect to the outer tube 13, which assures smooth rotation of the inner tube 14 against the pressure in the air chamber A.

Figure 3:
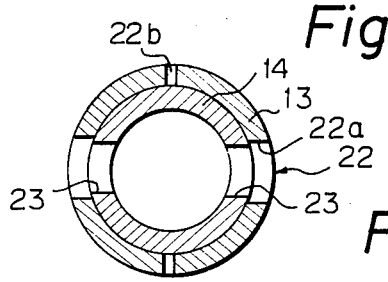
FIGS. 3 and 4 are enlarged sectional views showing a valve body and valve seat of the rotary valve of FIG. 2.
Figure 4:
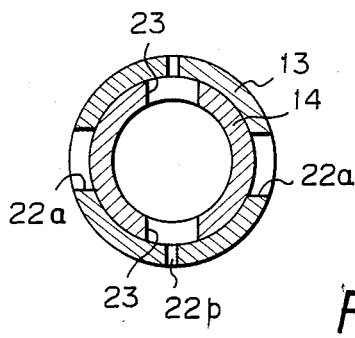
Figure 5:
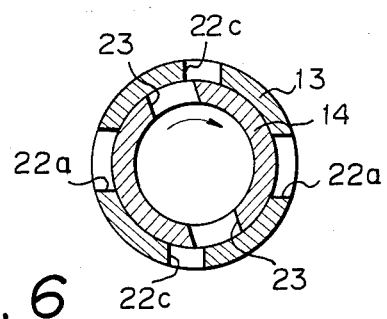
FIG. 5 is a view similar to FIG. 4 but showing a modified form.

A plurality of openings 22 and 23 are formed respectively in peripheral walls of the outer and inner tubes 13 and 14. As shown in FIGS. 3, 4, and 5, a pair of openings 23 which are spaced from each other by 180 degrees are found in inner tube 14, and two pairs of openings, 22 are formed in the outer tube 13 which consist including communicating holes 22a and 22a of large diameter and throttling openings 22b and 22b of small diameter, are formed in outer tube 13.

In operation, when a vertical force acts on the suspension device of FIG. 1 to contract the rod 2 into the main body 1, the pressure in the air chamber A increases. When the inner tube 13 is located at the condition shown in FIG. 3 to align the openings 23 in the inner tube 14 with openings 22a in the outer tube 13, the air chamber A is freely communicated with the air chamber B, and the spring constant of the air spring is small. When the inner tube 14 is rotated by 45 degrees from the condition of FIG. 3, the communication between air chambers A and B is intercepted, whereby the spring rate of the air spring is at the maximum. Further, when the inner tube 14 is rotated by 90 degrees from the condition of FIG. 3, the openings 23 in the inner tube 14 align with throttling openings 22b in the outer tube 13. The air in the air chamber A flows into the air chamber B through throttling openings 22b generating a damping force. By suitably determining the diameter of throttling opening 22b, it is possible to generate a damping force of up to about 20% of the hydraulic damper.

FIG. 5 shows a modified form wherein throttling openings 22c in the outer tube are formed to have a diameter larger than that of throttling openings 22b in the embodiment of FIGS. 3 and 4, and the inner tube 14 is rotated to a position for partially opening the throttling openings 22c, whereby the damping force of the air spring can be adjusted as desired.

Figure 6:
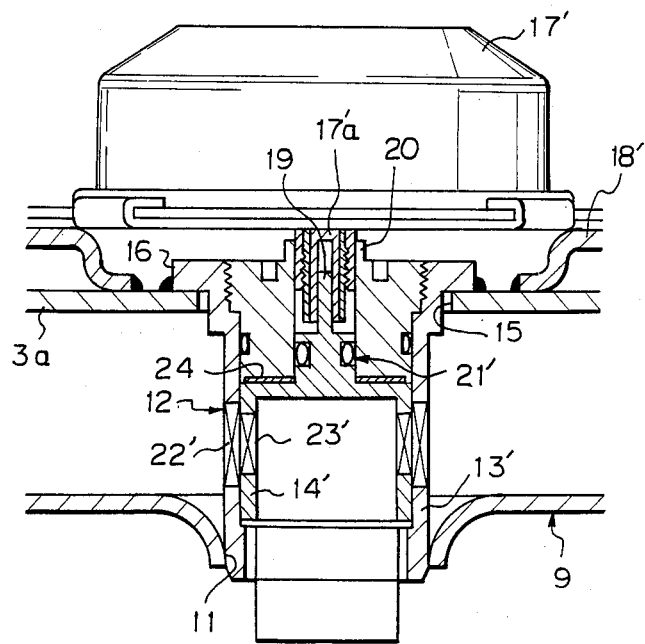
FIG. 6 is a view similar to FIG. 2 but showing a second embodiment of the invention.

FIG. 6 shows a second embodiment of the invention which is generally similar to the first embodiment of FIG. 2.

Figure 7:
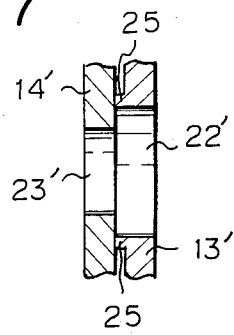
FIG. 7 is an enlarged partial longitudinal sectional view of the embodiment of FIG. 6.
Figure 8:
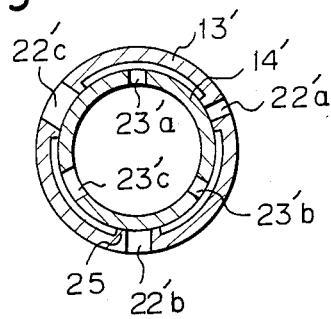
FIGS. 8 and 9 are enlarged cross-sectional views of FIG. 6 and similar to FIGS. 3-5.
Figure 9:
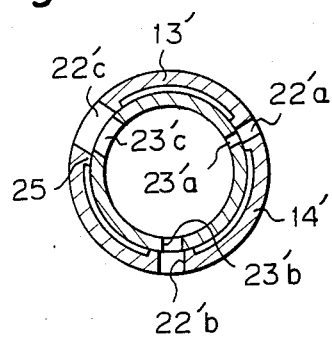

In FIG. 6, a rotary actuator 17' is substituted for the electric motor 17 in FIG. 2, and is mounted on the upper outer shell 3a through a bracket 18'. Shown at 21' is a thrust bearing arranged around the circumference of the shaft 19 of the inner tube 14', and at 24 is a thrust bearing provided on the upper surface of the inner tube 14'. A plurality of openings 22' and 23' are formed in the circumferential walls of outer and inner tubes 13' and 14' as shown in FIGS. 7, 8 and 9. In this embodiment, an annular projection 25 is formed around each of openings 22' of the outer tube 13' to slidably contact with the outer circumferential wall of the inner tube 14' whereby the sliding resistance between inner and outer tubes 14' and 13' can be minimized, and the siding ability between inner and outer tubes can be improved.

Figure 10:
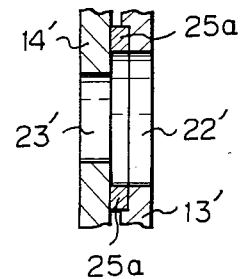
FIGS. 10, 11 and 12 are views similar to FIG. 7 but showing modified forms respectively.
Figure 11:
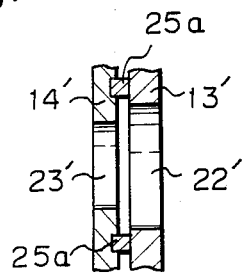
Figure 12:
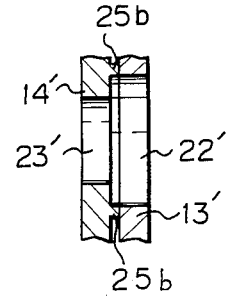

FIGS. 10, 11 and 12 show modified forms of annular projection 25. In FIGS. 10 and 11, annular seal rings 25a are provided between inner and outer tubes 14' and 13' surrounding respectively openings 22' and 23' and are mounted respectively on outer tube 13' and on inner tube 14'. In FIG. 12, an annular projection 25b is integrally formed on the inner tube 14' surrounding each of openings 23'.

Figure 13:
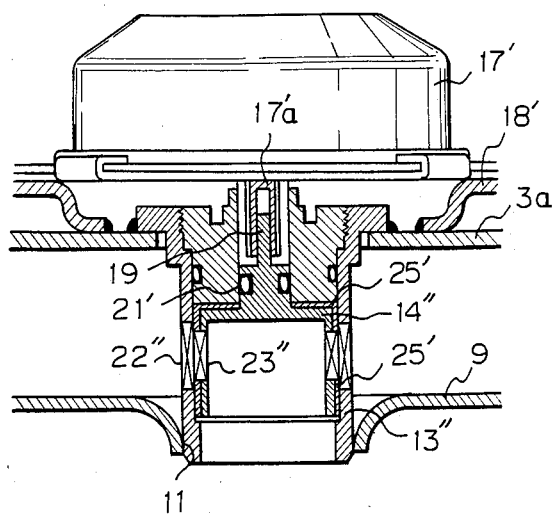
FIG. 13 is a view similar to FIG. 6 but showing a third embodiment of the invention.
Figure 14:
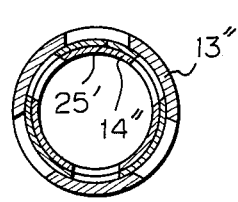
FIGS. 14 and 15 are partial cross-sectional views of the embodiment of FIG. 13 and similar to FIGS. 8 and 9 respectively.
Figure 15:
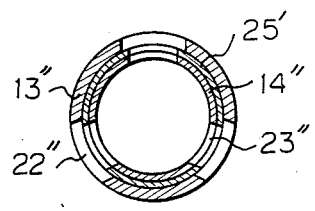

FIGS. 13, 14 and 15 show a further modified form, wherein a layer 25' of a synthetic resin material having self-lubricating characteristics such as PTFE covers the upper and circumferential outer surfaces of inner tube 14''. The layer 25' on the upper surface of the inner tube 14'' acts as a thrust bearing, and the layer covering the circumferential outer surface of the inner tube 14'' acts as a seal member and a radial bearing.

As described heretofore, according to the invention, the air spring in the suspension device comprises a plurality of air chambers and a rotary flow control valve is provided between two air chambers which makes it possible to freely communicate, to intercept communication between and to throttlingly communicate the two chambers. Thus, it is possible to change the spring constant of the air spring and to generate a damping force of a substantial amount, whereby it is possible to improve the driving comfort. Further, by providing a seal portion between a rotary valve body and a stationary valve seat number it is possible to improve the sealing characteristics of the rotary valve, and by forming the seal portion as annular seal portions it is possible to reduce frictional resistance to rotation of the rotary valve body. Further, the frictional resistance can further be reduced by providing a thrust bearing between the rotary valve body and the stationary valve seat member. Still further, it is possible to accurately rotate the rotary valve body to desired angular positions, and thus the spring rate and the damping force of the air spring can easily and accurately be adjsuted.

What is claimed is:

1. A suspension device comprising:
  a hydraulic damper including a main body and a piston rod slidably extending through an end of said main body;
  an air spring mounted between said main body and said piston rod and including first and second air chambers separated by a partition wall, such that upon movement of said piston rod relative to said main body the volume of said first air chamber varies and the volume of said second air chamber remains constant;
  an opening through said partition wall, at a position spaced from said piston rod; and
  means mounted on said partition wall at said position and defining a passage connected to said opening for communicating said first and second air chambers and for regulating the size of said passage, said means comprising a rotary flow control valve having therethrough at least one orifice, and means for operating said rotary flow control valve to thereby adjust the effective area of said orifice.

2. A device as claimed in claim 1, wherein said flow control valve comprises a stationary valve seat and a valve body mounted for rotary movement relative to said valve seat.

3. A device as claimed in claim 2, wherein said valve seat comprises an outer tube, and said valve body comprises an inner tube fitted within said outer tube for rotation therein, said outer and inner tubes having adjacent respective first ends open to said first air chamber through said opening and adjacent respective closed second ends, and said outer and inner tubes having orifices extending through respective circumferential walls thereof such that rotation of said inner tube within said outer tube causes said orifices to selectively open, close and throttle said passage.

4. A device as claimed in claim 3, wherein said inner and outer tubes each have a plurality of circumferentially spaced said orifices.

5. A device as claimed in claim 4, wherein said orifices in one of said inner and outer tubes are of different sizes.

6. A device as claimed in claim 2, further comprising a seal between said valve seat and said valve body.

7. A device as claimed in claim 6, wherein said seal comprises an annular metal ring.

8. A device as claimed in claim 6, wherein said seal comprises an annular ring of synthetic resin material having self-lubricating characteristics.

9. A device as claimed in claim 6, wherein said seal comprises an annular projection integrally formed on one of said valve seat and valve body.

10. A device as claimed in claim 2, wherein said valve body is supported through a thrust bearing against air pressure acting on said valve body.

* * * * *